(12) United States Patent
Toyama et al.

(10) Patent No.: US 10,388,944 B2
(45) Date of Patent: Aug. 20, 2019

(54) POSITIVE ELECTRODE ACTIVE MATERIAL FOR LITHIUM ION SECONDARY BATTERY, AND POSITIVE ELECTRODE FOR LITHIUM ION SECONDARY BATTERY AND LITHIUM ION SECONDARY BATTERY COMPRISING THE SAME

(71) Applicant: HITACHI METALS, LTD., Tokyo (JP)

(72) Inventors: Tatsuya Toyama, Tokyo (JP); Shin Takahashi, Tokyo (JP); Akira Gunji, Tokyo (JP); Xiaoliang Feng, Tokyo (JP); Hisato Tokoro, Tokyo (JP); Takashi Nakabayashi, Tokyo (JP); Shuichi Takano, Tokyo (JP); Sho Furutsuki, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 700 days.

(21) Appl. No.: 14/868,746

(22) Filed: Sep. 29, 2015

(65) Prior Publication Data

US 2016/0099460 A1    Apr. 7, 2016

(30) Foreign Application Priority Data

Oct. 6, 2014   (JP) ................................. 2014-205787
Mar. 31, 2015  (JP) ................................. 2015-073914

(51) Int. Cl.
*H01M 4/131*    (2010.01)
*H01M 10/0525*  (2010.01)
(Continued)

(52) U.S. Cl.
CPC .......... *H01M 4/131* (2013.01); *H01M 4/364* (2013.01); *H01M 4/382* (2013.01); *H01M 4/483* (2013.01);
(Continued)

(58) Field of Classification Search
None
See application file for complete search history.

(56) References Cited

U.S. PATENT DOCUMENTS

2009/0104517 A1* 4/2009 Yuasa ................... H01M 4/505
                                                429/158
2011/0281168 A1  11/2011 Watanabe et al.
(Continued)

FOREIGN PATENT DOCUMENTS

CN   103337614 A    10/2013
JP   2005-322616 A  11/2005
(Continued)

OTHER PUBLICATIONS

Korean Office Action dated Dec. 21, 2016 in the Korean Application No. 10-2015-0138455.
(Continued)

*Primary Examiner* — Basia A. Ridley
*Assistant Examiner* — Heng M. Chan
(74) *Attorney, Agent, or Firm* — Volpe and Koenig, P.C.

(57) ABSTRACT

A positive electrode active material includes a primary particle represented by Compositional Formula (1):

$$Li_{1+x}Ni_yCo_zM_{1-x-y-z}O_2 \qquad (1),$$

where x is a number satisfying a relation represented by an expression $-0.12 \leq x \leq 0.2$; y is a number satisfying a relation represented by an expression $0.7 \leq y \leq 0.9$; z is a number satisfying a relation represented by an expression $0.05 \leq z \leq 0.3$; and M is at least one element selected from the group consisting of Mg, Al, Ti, Mn, Zr, Mo, and Nb; or a secondary particle into which the primary particle aggregates. The primary particle or the secondary particle includes a free lithium compound in a weight proportion of 0.1% or more and 2.0% or less, and the weight of lithium
(Continued)

hydroxide in the free lithium compound is 60% or less of the weight of lithium carbonate in the free lithium compound.

12 Claims, 3 Drawing Sheets

(51) Int. Cl.
    *H01M 4/36*      (2006.01)
    *H01M 4/505*      (2010.01)
    *H01M 4/525*      (2010.01)
    *H01M 4/485*      (2010.01)
    *H01M 4/38*      (2006.01)
    *H01M 4/48*      (2010.01)

(52) U.S. Cl.
    CPC ........... *H01M 4/485* (2013.01); *H01M 4/505* (2013.01); *H01M 4/525* (2013.01); *H01M 10/0525* (2013.01)

(56) References Cited

U.S. PATENT DOCUMENTS

2014/0050656 A1*    2/2014    Kang .................... H01M 4/485
                                                                               423/594.6

2014/0057163 A1    2/2014    Bae et al.
2014/0087262 A1    3/2014    Imahashi et al.
2014/0186709 A1    7/2014    Iwanaga et al.

FOREIGN PATENT DOCUMENTS

| | | | |
|---|---|---|---|
| JP | 2009-259605 A | | 11/2009 |
| JP | 2010-155775 A | | 7/2010 |
| JP | 2012-230898 | | 11/2012 |
| JP | 2013-026199 A | | 2/2013 |
| JP | 2014-067546 A | | 4/2014 |
| KR | 10-2010-0109605 A | | 10/2010 |
| KR | 10-2013-0130357 | * | 12/2013 |
| KR | 10-2013-0130357 A | | 12/2013 |
| KR | 10-2014-0016314 A | | 2/2014 |
| KR | 10-2014-0025821 A | | 3/2014 |
| WO | WO 2012/150837 | * | 11/2012 |

OTHER PUBLICATIONS

Office Action in counterpart JP Application No. 2015-073914 dated Dec. 1, 2017.

Japanese Office Action dated Jun. 5, 2018 for the Japanese Patent Application No. 2015-073914.

* cited by examiner

POSITIVE ELECTRODE ACTIVE MATERIAL FOR LITHIUM ION SECONDARY BATTERY, AND POSITIVE ELECTRODE FOR LITHIUM ION SECONDARY BATTERY AND LITHIUM ION SECONDARY BATTERY COMPRISING THE SAME

CLAIM OF PRIORITY

The present application claims priority from Japanese patent application JP 2014-205787 filed on Oct. 6, 2014 and Japanese patent application JP 2015-073914 filed on Mar. 31, 2015, the content of which is hereby incorporated by reference into this application.

BACKGROUND OF THE INVENTION

Field of the Invention

The present invention relates to a positive electrode active material for a lithium ion secondary battery, and a positive electrode for a lithium ion secondary battery and a lithium ion secondary battery comprising the same.

Background Art

Lithium ion secondary batteries have higher energy density and smaller memory effect than those of other secondary batteries, such as nickel-hydrogen rechargeable batteries and nickel-cadmium rechargeable batteries. For this reason, lithium ion secondary batteries have been increasingly used in a broader range of applications from small-sized power supplies for mobile electronic apparatuses and electric apparatuses for household use to middle- or large-sized power supplies such as stationary power supplies for electricity storage units, uninterruptible power supply units, and power leveling units and driving power supplies for boats and ships, rail cars, hybrid vehicles, and electric vehicles, and a further improvement in battery performance has been demanded. In particular, high energy density is required for lithium ion secondary batteries developed as middle- or large-sized power supplies so as to attain high capacity at low volume.

To meet such a demand, $LiMO_2$ (where M represents an element such as Ni, Co, or Mn) positive electrode active materials having an $\alpha$-NaFeO$_2$ layer structure have been extensively developed because of their high charge-discharge capacity. Unfortunately, layered positive electrode active materials having a large content of Ni reduce charge-discharge cyclability, particularly output properties with cycles.

To solve these problems, techniques are proposed to improve the charge-discharge cyclability of the layered positive electrode active materials through a reduction in the amount of impurities present on surfaces of particles of the positive electrode active materials. For example, JP Patent Publication (Kokai) No. 2010-155775 discloses a positive electrode active material wherein powdery lithium composite compound particles represented by $Li_{1-x}Ni_{1-y-z}Co_yM_zO_2$ (where M is at least one or more of B and Al; $-0.02 \leq x \leq 0.02$, $0 \leq y \leq 0.20$, and $0 < z \leq 0.10$) are prepared using a technique of washing particles with water to remove impurities, and an ionic strength ratio A (LiO$^-$/NiO$_2^-$) is 0.3 or less and an ionic strength ratio B ($Li_3CO_3^+$/Ni$^+$) is 20 or less in analysis of the surfaces of the powdery lithium composite compound particles with a time-of-flight secondary ion mass spectrometer. In addition to this related art, JP Patent Publication (Kokai) No. 2013-026199 also discloses another technique of washing particles with water.

Other techniques are proposed in which the output properties of layered positive electrode active materials are enhanced by adjusting the voidages or open porosities of the positive electrode active materials. For example, JP Patent Publication (Kokai) No. 2014-67546 discloses a positive electrode active material comprising a secondary particle comprising primary particles having an average particle diameter of 0.01 μm or more and 5 μm or less, wherein the voidage is 3% or more and 30% or less and the open porosity is 70% or more.

SUMMARY OF THE INVENTION

It is believed that as disclosed in JP Patent Publication (Kokai) No. 2010-155775, a reduction in amounts of impurities present on the surfaces of the particles of the layered positive electrode active material, i.e., lithium hydroxide (LiOH) and lithium carbonate ($Li_2CO_3$) can prevent gelation of the coating material during preparation of an electrode or a side reaction caused in a battery with charge and discharge to improve charge-discharge cyclability. To reduce impurities present on the surfaces of the particles of the layered positive electrode active material, however, if the layered positive electrode active material is dispersed in water for washing, Li in the active material may be eluted to reduce the crystallinity of the active material surface and increase resistance.

As disclosed in JP Patent Publication (Kokai) No. 2014-67546, if the open porosity occupying in voids is 70% or more, an electrolyte solution can more readily permeate into positive electrode active material particles to promote diffusion of lithium ions into the particles. Moreover, the contact area between the electrolyte solution and the positive electrode active material increases, and an improvement in charge and discharge properties, particularly output properties can be expected. Unfortunately, if only the open porosity is increased, the contact area between the electrolyte solution and the positive electrode active material is increased. This may promote decomposition of the electrolyte solution to increase resistance.

Accordingly, an object of the present invention is to provide a positive electrode active material for a lithium ion secondary battery having low resistance, high capacity, and high charge-discharge cyclability, and a positive electrode for a lithium ion secondary battery and a lithium ion secondary battery comprising the same.

To solve the problems above, the positive electrode active material for a lithium ion secondary battery according to the present invention comprises a primary particle represented by Compositional Formula (1):

$$Li_{1+x}Ni_yCo_zM_{1-x-y-z}O_2 \qquad (1)$$

where x is a number satisfying a relation represented by an expression $-0.12 \leq x \leq 0.2$; y is a number satisfying a relation represented by an expression $0.7 \leq y \leq 0.9$; z is a number satisfying a relation represented by an expression $0.05 \leq z \leq 0.3$; and M is at least one element selected from the group consisting of Mg, Al, Ti, Mn, Zr, Mo, and Nb;

or a secondary particle into which the primary particle aggregates, wherein the primary particle or the secondary particle comprises a free lithium compound in a weight proportion of 0.1% or more and 2.0% or less, and the weight of lithium hydroxide in the free lithium compound is 60% or less of the weight of lithium carbonate in the free lithium compound.

The positive electrode for a lithium ion secondary battery according to the present invention comprises the positive electrode active material for a lithium ion secondary battery.

Furthermore, the lithium ion secondary battery according to the present invention includes the positive electrode for a lithium ion secondary battery.

The present invention can provide a positive electrode active material for a lithium ion secondary battery having low resistance, high capacity, and high charge-discharge cyclability, and a positive electrode for a lithium ion secondary battery and a lithium ion secondary battery comprising the same.

DETAILED DESCRIPTION OF THE PREFERRED EMBODIMENTS

Figure 1:
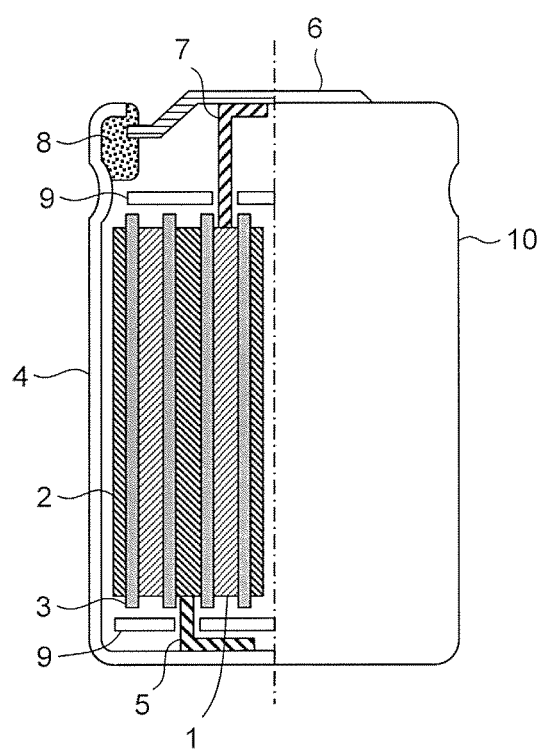
FIG. 1 is a sectional schematic view illustrating one embodiment of the lithium ion secondary battery according to the present invention.

The positive electrode active material for a lithium ion secondary battery, the positive electrode for a lithium ion secondary battery, and the lithium ion secondary battery according to one embodiment of the present invention will now be described in detail.

The positive electrode active material for a lithium ion secondary battery according to the present embodiment is a positive electrode active material having a layer structure, comprising primary particles or secondary particles into which the primary particles aggregate. The primary particles or the secondary particles comprise a free lithium compound containing lithium hydroxide and lithium carbonate in specific weight proportions. Throughout the specification, the free lithium compound indicates a water-soluble lithium-containing compound other than the compound functioning as a positive electrode active material. Namely, throughout the specification, the primary particles or the secondary particles contain the free lithium compound in addition to the compound functioning as a positive electrode active material. Throughout the specification, the term "composition" or "compositional formula" of the primary particles or the secondary particles indicates the "composition" or "compositional formula" of only the compound functioning as the positive electrode active material (excluding the free lithium compound).

The positive electrode active material for a lithium ion secondary battery according to the present embodiment comprises a primary particle represented by Compositional Formula (1):

$$Li_{1+x}Ni_yCo_zM_{1-x-y-z}O_2 \quad (1)$$

where x is a number satisfying a relation represented by an expression $-0.12 \leq x \leq 0.2$; y is a number satisfying a relation represented by an expression $0.7 \leq y \leq 0.9$; z is a number satisfying a relation represented by an expression $0.05 \leq z \leq 0.3$; and M is at least one element selected from the group consisting of Mg, Al, Ti, Mn, Zr, Mo, and Nb;

or a secondary particle into which the primary particle aggregates, wherein the primary particle or the secondary particle comprises a free lithium compound in a weight proportion of 0.1% or more and 2.0% or less, and the weight of lithium hydroxide in the free lithium compound is 60% or less of the weight of lithium carbonate in the free lithium compound.

This layered positive electrode active material enables repeated reversible insertion and elimination of lithium ions with charge and discharge. The positive electrode active material has low resistance.

Although high capacity can be expected in the layered positive electrode active material represented by Compositional Formula (1), this layered positive electrode active material does not always have high charge-discharge cyclability if a predetermined amount or more of Li is drawn. If lithium ion secondary batteries comprising this layered positive electrode active material are charged to high voltage, their charge-discharge cyclability significantly reduces, and normally the end-of-charge voltage is set low; thus, the high theoretical capacity cannot be fully utilized.

One of factors which reduce the charge-discharge cyclability of the layered positive electrode active material is the free lithium compound contained in the layered positive electrode active material. The free lithium compound is mainly composed of lithium carbonate and lithium hydroxide. In particular, decomposition of the electrolyte solution caused by contact between lithium hydroxide and the electrolyte solution appears to reduce the charge-discharge cyclability of the layered positive electrode active material. It is believed that since lithium hydroxide has a hydroxyl group, the hydroxyl groups react with a fluorine-containing electrolyte contained in the electrolyte solution to generate a strong acid hydrofluoric acid (HF). In addition, decomposition of the electrolyte solution by oxidation due to an increase in voltage is promoted to reduce the battery performance.

In the positive electrode active material for a lithium ion secondary battery according to the present embodiment, the charge-discharge capacity and the charge-discharge cyclability are improved by increasing the proportion of Ni contributing to high capacity to maintain high charge-discharge capacity and by reducing the absolute amount of the free lithium compound contained in the primary particles or the secondary particles to prevent progression of decomposition of the electrolyte solution by oxidation due to contact between lithium hydroxide and the electrolyte solution and using a smaller weight of lithium hydroxide, in particular, than the weight of lithium carbonate.

In Compositional Formula (1), x represents an over- or undersupply of Li compared to the stoichiometric ratio (Li:M:O=1:1:2) of the layered positive electrode active material ($LiMO_2$). As the amount of Li is larger, the valence of the transition metal before charge is higher to reduce the percentage of the change in valence of the transition metal during elimination of Li, thus improving the charge-discharge cyclability. However, as the amount of Li is larger, the charge-discharge capacity of the layered positive electrode active material is lower. Accordingly, x is within the range of $-0.12$ or more and 0.2 or less, preferably $-0.1$ or more and 0.2 or less, particularly preferably $-0.05$ or more and 0.1 or less. A composition having x of $-0.12$ or more can ensure a sufficient amount of Li to contribute to charge and discharge, attaining high capacity. A composition having x of 0.2 or less can ensure sufficient charge compensation for the change in valence of the transition metal, and is particularly effective in compatibility between high capacity and high charge-discharge cyclability.

In Compositional Formula (1), the Ni content is within the range of 0.7 or more and 0.9 or less. A composition having a Ni content of 0.7 or more can ensure a sufficient amount of Ni to contribute to charge and discharge, attaining high capacity. In a composition having a Ni content of more than 0.9, Li sites is partially replaced with Ni, so that a sufficient amount of Li to contribute to charge and discharge cannot be ensured and the charge-discharge capacity may be reduced. The Ni content is within the range of more preferably 0.75 or more and 0.85 or less.

In Compositional Formula (1), the Co content is within the range of 0.05 or more and 0.3 or less. A composition having a Co content of 0.05 or more can maintain the layer structure to attain high charge-discharge cyclability. A composition having a Co content of more than 0.3 is industrially disadvantageous because Co is expensive. The Co content is within the range of more preferably 0.1 or more and 0.2 or less.

In Compositional Formula (1), M is another metal element appropriately added rather than an essential component. M is at least one element selected from the group consisting of Mg, Al, Ti, Mn, Zr, Mo, and Nb. In Compositional Formula (1), the transition metal element such as Ni or Co contained in the layered positive electrode active material can ensure the electrochemical activity thereof. The sites of these transition metals can be replaced with at least one element, as an element for M, selected from the group consisting of Mg, Al, Ti, Mn, Zr, Mo, and Nb to improve the stability of the crystal structure and the electrochemical properties (such as cycle properties) of the layered positive electrode active material.

The composition of the primary particle or the secondary particle in the positive electrode active material for a lithium ion secondary battery according to the present embodiment is not limited by any strict stoichiometric ratio. The composition may have a variable ratio of components within the range without departing from the gist of the present invention, or the primary particle or the secondary particle may have replaced sites or deficits in a crystal structure. In other words, a variation in composition caused by a variation in the crystal composition within the range to maintain the layer compound structure can be allowed. For this reason, the amount of M is $(1-x-y-z)$ in the composition having an ideal balance while the amount of M within the allowable range can be deviated from the value of $(1-x-y-z)$. The allowable range is about ±0.06. An over- or undersupply of oxygen can be allowed within the range to maintain the layer structure.

The positive electrode active material for a lithium ion secondary battery according to the present embodiment comprises primary particles having a predetermined composition or secondary particles into which the primary particles aggregate. These primary particles or secondary particles may comprise a free lithium compound. The free lithium compound is not a compound enabling reversible insertion and elimination of Li, and comprises at least lithium carbonate and a compound selected from the group consisting of lithium hydroxide, lithium sulfate, lithium nitrate, and lithium chloride. In the positive electrode active material for a lithium ion secondary battery according to the present embodiment, the weight of lithium hydroxide in the free lithium compound is 60% or less of the weight of lithium carbonate.

As described above, lithium hydroxide reacts with a fluorine-containing electrolyte contained in the electrolyte solution to generate a strong acid hydrofluoric acid (HF). In addition, an increase in voltage promotes decomposition of the electrolyte solution by oxidation to reduce the battery performance. For these reasons, high charge-discharge cyclability is difficult to attain. In the positive electrode active material for a lithium ion secondary battery according to the present embodiment, a reduction in the absolute amount of the free lithium compound, particularly the weight of lithium hydroxide prevents decomposition of the electrolyte solution caused by contact between lithium hydroxide and the electrolyte solution to improve charge-discharge cyclability.

A significantly high weight proportion of the free lithium compound tends to reduce the charge-discharge capacity. A small amount of $Li_2CO_3$ present as a free lithium compound is preferred because it causes a reaction $Li_2CO_3 + CO_2 + 2LiHCO_3$ to react $CO_2$ and $H_2O$ in the air with Li in crystals, thereby preventing a reduction in the amount of Li in crystals. Accordingly, the primary particles or the secondary particles in the positive electrode active material for a lithium ion secondary battery according to the present embodiment contains the free lithium compound in a weight proportion of 0.1% or more and 2.0% or less. The weight proportion is more preferably 0.1% or more and 1.0% or less. The weight proportion is still more preferably 0.4% or more and 0.8% or less. A weight proportion within this range can attain compatibility between high discharge capacity properties and high charge-discharge cyclability. The content of lithium carbonate in the primary particles or the secondary particles in the positive electrode active material is preferably 0.07% by weight or more and 1.50% by weight or less.

Another factor to reduce the charge-discharge cyclability of the layered positive electrode active material includes breakage of the secondary particles caused by expansion and shrinkage of the layered positive electrode active material during charge and discharge. If the secondary particles break, the contact area between the surfaces of the secondary particles and the electrolyte solution increases more than needed, so that decomposition of the electrolyte solution may be promoted to reduce the battery performance.

To prevent the breakage of the secondary particles caused by expansion and shrinkage of the layered positive electrode active material during charge and discharge, the positive electrode active material for a lithium ion secondary battery according to the present embodiment comprises secondary particles having open pores whose voids are connected to the surfaces of the particles. More preferably, the open pore volume ratio (proportion of the total volume of open pores having a micropore diameter of 0.1 μm or more and 0.5 lgm or less in the apparent volume of the secondary particles) is 7% or more and 20% or less at a micropore diameter ranging from 0.1 μm or more to 0.5 μm or less, the micropore diameter determined by mercury porosimetry. A significantly low open pore volume ratio makes it difficult to prevent the breakage of the secondary particles caused by expansion and shrinkage of the layered positive electrode active material during charge and discharge. A significantly high open pore volume ratio reduces the proportion of the positive electrode active material in the electrode, leading to difficulties in attaining high charge-discharge capacity. As described above, the open pore volume ratio of the secondary particles is preferably 7% or more and 20% or less, more preferably 8% or more and 16% or less. An open pore volume ratio within this range can attain compatibility between high charge-discharge capacity properties and high charge-discharge cyclability.

The voids of the secondary particles include open pores connected to the surfaces of the particles and closed pores not connected to the surfaces of the particles. Among pores of these two types, the closed pores barely contribute to charge and discharge, and thus control of the open porosity is effective.

In the positive electrode active material for a lithium ion secondary battery according to the present embodiment, the Ni concentration on the surfaces of the primary particles or secondary particles is preferably lower than the Ni concentration near the centers of the particles. Throughout the specification, the term "surface" indicates a region from the outer surface of a primary or secondary particle to a depth of 20 nm and the term "near the center" indicates a region of 50% of the diameter including the center of the primary or secondary particle when the diameter of the primary or secondary particle corresponds to 100%. The Ni concentration is the average concentration of Ni in each region. Ni is unstably charged during charge of the battery, and may promote decomposition of the electrolyte solution by oxidation to reduce the battery performance. Preferably, the Ni concentration is lower only near the surfaces of the particles. Throughout the specification, the term "low concentration" indicates that the value (atomic ratio) of Ni/(Ni+Co+M) on the surface of the particle is at least 0.01 lower than that near the center thereof.

The crystal structure of the particles of the positive electrode active material for a lithium ion secondary battery according to the present embodiment can be confirmed by X-ray diffraction (XRD), for example. The average composition of the particles of positive electrode active material for a lithium ion secondary battery according to the present embodiment (in this case, referred to the average composition including the compound functioning as a positive electrode active material and the free lithium compound) can be confirmed by high frequency inductively coupled plasma (ICP) or atomic absorption spectrometry (AAS), for example. Furthermore, the element distribution of the particles of the positive electrode active material for a lithium ion secondary battery according to the present embodiment can be confirmed by time-of-flight secondary ion mass spectrometry (TOF-SIMS), auger electron spectroscopy (AES), X-ray photoelectron spectroscopy (XPS), or transmission electron microscopy-electron energy loss spectroscopy (TEM-EELS), for example.

The open pore volume in the positive electrode active material for a lithium ion secondary battery according to the present embodiment is determined by mercury porosimetry. Only the voids (open pores) connected to the surfaces of the particles are measured but the closed pores are not measured by mercury porosimetry. The value obtained from the measurement should not include voids between secondary particles. For this reason, the open pore volume is determined using particles at a micropore diameter within the range of 0.1 µm or more and 0.5 m or less in the present embodiment. The open pore volume ratio can be calculated from the product of the open pore volume (per unit weight) described above and the apparent density of the secondary particles.

In the positive electrode active material for a lithium ion secondary battery according to the present embodiment, the amount of the free lithium compound in the primary particles or secondary particles can be confirmed by titration method, temperature programmed desorption-mass spectrometry (TPD-MS), or ion chromatography (IC), for example. The value of "1+x" in Compositional Formula (1) is then calculated from the average composition of the particles determined by ICP and the amount of the free lithium compound determined above in the positive electrode active material for a lithium ion secondary battery.

The average particle diameter of the primary particles of the positive electrode active material for a lithium ion secondary battery according to the present embodiment is preferably 0.1 µm or more and 2 µm or less. An average particle diameter of 2 µm or less can improve the filling properties of the positive electrode active material in the positive electrode to attain high energy density. In the positive electrode active material, the primary particles prepared may be granulated into the secondary particles through dry or wet granulation. The primary particles can be granulated with a granulator such as a spray dryer or a tumbling fluidized bed apparatus. The average particle diameter of the secondary particles is preferably 5 µm or more and 50 µm or less.

The average particle diameter can be determined based on observation with a scanning electron microscope (SEM) or a transmission electron microscope (TEM). In observation, ten primary or secondary particles in descending order of closeness to the median particle diameter are extracted, and the weighed average of these ten particle diameters are determined by calculation. The weighed average is defined as the average particle diameter. The particle diameter can be determined as the average of the long diameter and the short diameter of the particle in the electron microscopic image obtained through observation.

The BET specific surface area of the positive electrode active material for a lithium ion secondary battery according to the present embodiment is preferably 0.2 m$^2$/g or more and 1.5 m$^2$/g or less. The BET specific surface area is particularly preferably 0.2 m$^2$/g or more and 1.0 m$^2$/g or less. A BET specific surface area of 1.5 m$^2$/g or less, preferably 1.0 m$^2$/g or less can improve the filling properties of the positive electrode active material in the positive electrode to attain high energy density. The BET specific surface area can be determined with an automatic specific surface area analyzer.

The method of preparing the positive electrode active material for a lithium ion secondary battery according to the present embodiment will be described. The positive electrode active material can be prepared by a known method of preparing a positive electrode active material. Examples of such a method include a solid phase method, a coprecipitation method, a sol-gel method, and a hydrothermal method.

In preparation of a positive electrode active material by the solid phase method, raw materials, such as a Li-containing compound, a Ni-containing compound, a Co-containing compound, and an M-containing compound, are weighed at a predetermined element compositional ratio, are ground, and are mixed to prepare a raw material powder. Examples of usable Li-containing compounds include lithium acetate, lithium nitrate, lithium carbonate, lithium hydroxide, lithium chloride, and lithium sulfate. Preferred is use of lithium carbonate or lithium hydroxide. Examples of usable Ni- and Co-containing compounds include oxides, hydroxides, carbonates, sulfates, and acetates of Ni and Co. Preferred is use of oxides, hydroxides, and carbonates thereof. Examples of usable M-containing compounds include acetates, nitrates, carbonates, sulfates, oxides, and hydroxides of M. Preferred is used of carbonates, oxides, and hydroxides thereof.

The raw materials can be ground and mixed by either of dry and wet grinding processes to prepare the raw material powder. A mill, such as a ball mill, a bead mill, a planetary ball mill, an attritor, or a jet mill can be used as a grinding method.

The raw material powder is formed into the primary particles of the positive electrode active material through burning. The raw material powder is preferably burned as follows: The raw material powder is pre-burned to pyrolyze the raw material compounds, and is sintered by main burning. The raw material powder may be appropriately disintegrated and classified before the main burning. The heating temperature in pre-burning is, for example, about 400° C. or more and 700° C. or less, and the heating temperature during main burning is, for example, 700° C. or more and 900° C. or less, preferably 750° C. or more and 850° C. or less. At temperatures within these ranges, the crystallinity of the particles can be enhanced while decomposition of the positive electrode active material and volatilization of the components are prevented. The burning time in pre-burning is 2 hours or more and 24 hours or less, preferably 4 hours or more and 16 hours or less. The burning time in main burning is 2 hours or more and 24 hours or less, preferably 4 hours or more and 16 hours or less. The burning step may be repeated several times. The particles do not need to be washed with water after burning in the present invention.

The burning step may be performed under one of an inert gas atmosphere and an oxidation gas atmosphere. Preferred is an oxidation gas atmosphere of oxygen or air. The burning step performed under an oxidation gas atmosphere can prevent mixing of impurities due to insufficient pyrolysis of the raw material compounds and can improve the crystallinity. The burned particles may be gradually cooled, may be cooled in the air, or may be quenched with liquid nitrogen.

In particular, the present invention is characterized in that the free lithium compound contained in the primary particles or the secondary particles is 0.1% or more and 2.0% or less and the weight of the lithium hydroxide in the free lithium compound is 60% or less of the weight of lithium carbonate. In preparation of the positive electrode active material for a lithium ion secondary battery according to the present embodiment, the above ranges "0.1% or more and 2.0% or less" and "60% or less" can be attained by adjusting the composition of the raw material powder or varying the burning conditions. A weight of lithium hydroxide of 60% or less can be attained by a method of varying the burning conditions but the method should not be limited to this: For example, the burning step is performed under an oxygen atmosphere if lithium carbonate is used as the Li-containing compound, or the particles after main burning are air-cooled under a carbon dioxide gas atmosphere if lithium hydroxide is used as the Li-containing compound. In the present invention, the amount of the free lithium compound contained in the primary particles or the secondary particles is determined from the measurement of the sample left in the air within 10 hours after main burning. If the sample is left for more than 10 hours, lithium hydroxide is converted into lithium carbonate in the air to increase the carbon content.

The open pore volume ratio can be controlled by appropriately setting the granulation conditions during granulation of the primary particles with a granulator such as a spray dryer or a tumbling fluidized bed apparatus or the burning temperature in the burning step. For example, an increase in the burning temperature promotes sintering of the primary particles to reduce the open pore volume ratio whereas a reduction in the burning temperature increases the open pore volume ratio. The granulation step may be performed after the pre-burning step, or may be performed after grinding and mixing of the raw material powder.

The resulting positive electrode active material for a lithium ion secondary battery is used as a material for a positive electrode for a lithium ion secondary battery.

The positive electrode for a lithium ion secondary battery according to the present embodiment includes mainly a positive electrode mixture layer comprising a positive electrode active material for a lithium ion secondary battery, a conductive material, and a binder, and a positive electrode current collector having the positive electrode mixture layer applied thereto.

Standard conductive materials used in lithium ion secondary batteries can be used as the conductive material. Specific examples thereof include carbon particles and carbon fibers of graphite powder, acetylene black, furnace black, thermal black, and channel black. The conductive material can be used in an amount of about 3% by mass or more and 10% by mass or less relative to the total mass of the positive electrode mixture layer, for example.

Standard binders used in lithium ion secondary batteries can be used as the binder. Specific examples thereof include poly(vinylidene fluoride) (PVDF), poly(tetrafluoroethylene), poly(hexafluoropropylene), styrene-butadiene rubber, and carboxymethyl cellulose. The binder can be used in an amount of about 2% by mass or more and 10% by mass or less relative to the total mass of the positive electrode mixture layer, for example.

Aluminum or aluminum alloy foils, expanded metals, and punched metals can be used as the positive electrode current collector. The foils can have a thickness of about 8 μm or more and 20 μm or less, for example.

The positive electrode for a lithium ion secondary battery according to the present embodiment can be prepared with the positive electrode active material for a lithium ion secondary battery by a standard method of preparing a positive electrode. An exemplary method of preparing a positive electrode for a lithium ion secondary battery comprises a positive electrode mixture preparation step, a positive electrode mixture application step, and a molding step.

In the positive electrode mixture preparation step, the materials, that is, the positive electrode active material, the conductive material, and the binder are mixed in a solvent to prepare a positive electrode mixture in the form of a slurry. The solvent can be selected according to the type of the binder from N-methylpyrrolidone, water, N,N-dimethylfornnamide, N,N-dimethylacetamide, methanol, ethanol, propanol, isopropanol, ethylene glycol, diethylene glycol, glycerol, dimethyl sulfoxide, and tetrahydrofuran. Examples of the method of mixing the materials include planetary mixers, dispersion mixers, and rotary and revolving mixers.

In the positive electrode mixture application step, the resulting slurry of the positive electrode mixture is applied onto a positive electrode current collector, and then is dried through a heat treatment for removal of the solvent to form a positive electrode mixture layer. Examples of the method of applying the positive electrode mixture include bar coaters, doctor blades, and roll transfer machines.

In the molding step, the dried positive electrode mixture layer is molded under pressure with a roll press, and when necessary is cut with the positive electrode current collector to form a positive electrode for a lithium ion secondary battery having a desired shape. The thickness of the positive electrode mixture layer formed on the positive electrode current collector can be about 50 μm or more and 300 μm or less, for example.

The resulting positive electrode for a lithium ion secondary battery is used as a material for lithium ion secondary batteries. The lithium ion secondary battery according to the present embodiment comprises mainly a positive electrode for a lithium ion secondary battery, a negative electrode for a lithium ion secondary battery, a separator, and a non-aqueous electrolyte, which are accommodated in a casing. The casing has various shapes such as cylindrical shapes, prismatic shapes, button shapes, and laminate sheet shapes.

FIG. 1 is a sectional schematic view illustrating an example of the lithium ion secondary battery according to the present embodiment. FIG. 1 illustrates a cylindrical lithium ion secondary battery. This lithium ion secondary battery 10 includes a group of electrodes composed of a positive electrode 1 disposed by applying a positive electrode mixture onto both surfaces of a positive electrode current collector, a negative electrode 2 disposed by applying a negative electrode mixture onto both surfaces of a negative electrode current collector, and a separator 3 disposed between the positive electrode 1 and the negative electrode 2. The positive electrode 1 and the negative electrode 2 separated by the separator 3 are wound, and are accommodated in a cylindrical battery can 4. The positive electrode 1 is electrically connected to a hermetically sealing lid 6 through a positive electrode lead piece 7. The negative electrode 2 is electrically connected to the battery can 4 through a negative electrode lead piece 5. An insulating plate 9 made of an epoxy resin is disposed between the positive electrode lead piece 7 and the negative electrode 2, and the negative electrode lead piece 5 and the positive electrode 1 for electrical insulation. These lead pieces are made of the same material as that for the current collector. These members for drawing the current are bonded to the respective current collectors through spot welding or ultrasonic welding. The battery can 4 is sealed with a sealing material 8 such as rubber after injection of a non-aqueous electrolyte, and the top of the battery can is sealed with the hermetically sealing lid 6.

The negative electrode for a lithium ion secondary battery can be composed of a standard negative electrode active material and negative electrode current collector used in lithium ion secondary batteries.

One or more negative electrode active materials such as metal lithium, carbon materials, metal materials, and metal oxide materials can be used. Examples of the carbon materials include graphites such as natural graphite and artificial graphite; carbides such as cokes and pitch; amorphous carbon; and carbon fibers. Examples of the metal materials include lithium, silicon, tin, aluminum, indium, gallium, and magnesium and alloys thereof. Examples of the metal oxide materials include metal oxides such as tin and silicon.

The negative electrode for a lithium ion secondary battery may comprise, when necessary, a binder and a conductive material selected from the same groups thereof used in the positive electrode for a lithium ion secondary battery. The binder can be used in an amount of about 5% by mass relative to the total mass of the negative electrode mixture layer, for example.

Copper or nickel foils, expanded metals, and punched metals can be used as the negative electrode current collector. The foil can have a thickness of about 5 μm or more and 20 μm or less, for example.

The negative electrode for a lithium ion secondary battery is prepared in the same manner as in the positive electrode for a lithium ion secondary battery: A negative electrode mixture of the negative electrode active material and the binder is applied onto a negative electrode current collector, is molded under pressure, and is cut when necessary. The negative electrode mixture layer formed on the negative electrode current collector can have a thickness of about 20 μm or more and 150 μm or less, for example.

The separator can be prepared using microporous films or non-woven fabrics composed of polyolefin resins such as polyethylene, polypropylene, and polyethylene-polypropylene copolymer, polyamide resins, and aramid resins.

Solutions of lithium salts in non-aqueous solvents can be used as the non-aqueous electrolyte, and examples of the lithium salts include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, and $LiC(CF_3SO_2)_3$. The concentration of the lithium salt in the non-aqueous electrolyte is preferably 0.7 M or more and 1.5 M or less.

Examples of usable non-aqueous solvents include diethyl carbonate, dimethyl carbonate, ethylene carbonate, propylene carbonate, vinylene carbonate, ethyl methyl carbonate, methyl propyl carbonate, methyl acetate, and dimethoxyethane. A variety of additives can be added to the non-aqueous electrolyte to prevent decomposition of the electrolyte solution by oxidation and decomposition due to reduction, prevent precipitation of metal elements, enhance ion conductivity, and enhance flame retardancy. Examples of such additives include 1,3-propanesultone and 1,4-butanesultone which prevent decomposition of the electrolyte solution; insoluble poly(adipic anhydride) and hexahydrophthalic anhydride which enhance the preserving properties of the electrolyte solution; and fluorine-substituted alkylboron which enhances flame retardancy.

The lithium ion secondary battery according to the present embodiment having the above configuration can be used as small-sized power supplies for mobile electronic apparatuses and electric apparatuses for household use as well as stationary power supplies for electricity storage units, uninterruptible power supply units, and power leveling units and driving power supplies for boats and ships, rail cars, hybrid vehicles, and electric vehicles.

EXAMPLES

The present invention will now be described in detail by way of the Examples and the Comparative Examples, but technical range of the present invention will not be limited by these.

Example 1

The positive electrode active material for a lithium ion secondary battery according to Example 1 was prepared by the following procedure. First, raw materials lithium carbonate, nickel carbonate, cobalt carbonate, and manganese carbonate were weighed such that the molar concentration ratio of Li:Ni:Co:Mn was 1.03:0.75:0.15:0.10. These materials were ground by a wet process, and were mixed to prepare a raw material powder. After the raw material powder was spray dried with a spray dryer, the raw material powder was placed in a high-purity alumina container, and underwent pre-burning under an oxygen stream at 600° C. for 12 hours. The pre-burned product was cooled in the air, and was disintegrated. The resulting product was again placed in a high-purity alumina container, and underwent main burning under an oxygen stream at 780° C. for 8 hours. This burned product was cooled in the air, was disintegrated, and was classified.

The crystal structure of the resulting positive electrode active material was analyzed. From the results in measurement with CuKt-rays in an X-ray diffraction analyzer (RINT-III manufactured by Rigaku Corporation), the peak attributed to R3-m was confirmed in the layer structure. The average composition was determined by ICP. The compositional ratio of Li:Ni:Co:Mn was 1.00:0.75:0.15:0.10.

The total amount of the free lithium compound was determined by a titration method. The amount of $Li_2CO_3$ was determined by an IC method. Assuming that the rest was all LiOH, the amount of LiOH was determined. It turned out that the amount of LiOH was 0.08% by weight, that of $Li_2CO_3$ was 0.49% by weight, and the weight of LiOH was 16% of that of $Li_2CO_3$. The lithium raw material used was a carbonate $Li_2CO_3$, and it is most likely that raw materials other than $Li_2CO_3$ may be present as LiOH, which is fonned by reacting with moisture in the air. These support the correctness of the assumption that the rest of the total free lithium compound excluding $Li_2CO_3$ is LiOH. The compositional formula calculated from the average composition determined by ICP and the amount of the free lithium compound determined was $Li_{0.984}Ni_{0.75}Co_{0.15}Mn_{0.10}O_2$.

Figure 2:
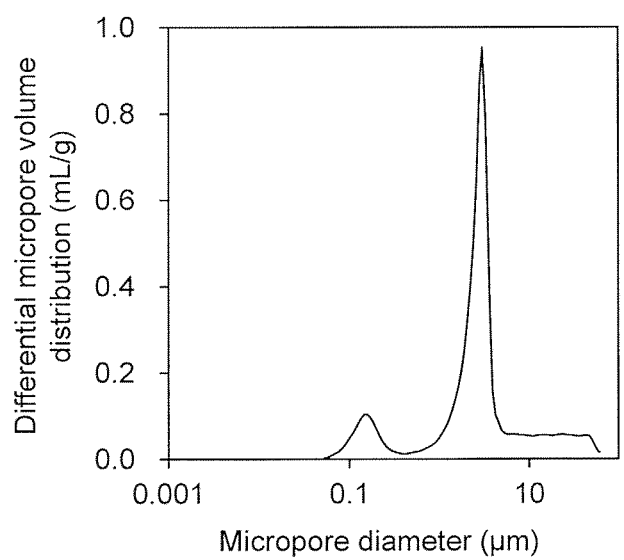
FIG. 2 is a diagram illustrating a pore volume distribution of secondary particles in Example 1 determined by mercury porosimetry.

The micropore volume distribution of the secondary particles determined by mercury porosimetry is shown in FIG. 2. The apparatus used in the measurement was AutoPore 9520 manufactured by Micromeritics Instrument Corporation. The open pore volume was 0.404 ml/g at a micropore diameter ranging from 0.1 µm or more to 0.5 µm or less, and the apparent density of the secondary particles was 3.58 g/ml. Accordingly, it turned out that the open pore volume ratio was 14%.

The average particle diameter of the primary particles in the positive electrode active material was calculated. The primary particles were observed with a scanning electron microscope (S-4300 manufactured by Hitachi High-Technologies Corporation) at an accelerating voltage of 5 kV and a magnification of 10 k, and the average particle diameter of ten primary particles was calculated as the average particle diameter. The average particle diameter was 0.6 µm.

The BET specific surface area of the positive electrode active material was determined. The specific surface area was calculated with an automatic specific surface area/micropore distribution analyzer (BELSORP-mini manufactured by MicrotracBEL Corp.) from an adsorption-desorption isothermal curve by a Langmuir method. The BET specific surface area was 0.5 $m^2/g$.

Next, a lithium ion secondary battery including a positive electrode comprising the positive electrode active material for a lithium ion secondary battery was prepared. First, the positive electrode active material (90 parts by mass), a conductive material (6 parts by mass), and a binder (4 parts by mass) were mixed in a solvent, and were stirred with a planetary mixer for 3 hours to prepare a positive electrode mixture. The conductive material used was powdery carbon particles. The binder used was poly(vinylidene fluoride). The solvent used was N-methylpyrrolidone. The positive electrode mixture was then applied onto one surface of a positive electrode current collector made of an aluminum foil having a thickness of 15 µm with a blade coater. The workpiece was pressurized with a roll press such that the mixture density was 2.70 $g/cm^3$, and was punched into a disc having a diameter of 15 mm. This disc was used as a positive electrode for a lithium ion secondary battery.

A negative electrode was prepared with metal lithium. The non-aqueous electrolyte used was a solution of 1.0 mol/L $LiPF_6$ in a mixed solvent of ethylene carbonate and dimethyl carbonate (volume ratio of 1:2). A lithium ion secondary battery according to Example 1 was prepared.

Next, the lithium ion secondary battery was subjected to a charge and discharge test to evaluate the discharge capacity properties and the charge-discharge cyclability. The charge and discharge test was performed under an environmental temperature of 25° C.

The discharge capacity properties were determined by the following procedure. Charge and discharge were performed on the following conditions: the battery was charged at a constant current corresponding to 0.2 C and a low voltage to an upper limit voltage of 4.3 V; then, after a pause for 30 minutes, the battery was discharged at a constant current corresponding to 0.2 C to a lower limit voltage of 3.0 V. This charge and discharge cycle was repeated two cycles in total. The 0.2 C discharge capacity in the second cycle was used as the value per weight of the positive electrode active material to evaluate the discharge capacity properties.

The charge-discharge cyclability was determined by the following procedure. After the discharge capacity properties were evaluated, the battery was charged at a constant current corresponding to 1 C and a low voltage to an upper limit voltage of 4.3 V; then, after a pause for 10 minutes, the battery was discharged at a constant current corresponding to 1.0 C to a lower limit voltage of 3.0 V. After this charge and discharge cycle was repeated 47 cycles in total, the battery was charged at a constant current corresponding to 0.2 C and a low voltage to an upper limit voltage of 4.3 V; then, after a pause for 30 minutes, the battery was discharged at a constant current corresponding to 0.2 C to a lower limit voltage of 3.0 V. The proportion of the 0.2 C discharge capacity in the 50th cycle to the discharge capacity properties was calculated as the cycle capacity retention rate to evaluate the charge-discharge cyclability.

As a result, the discharge capacity properties of the lithium ion secondary battery according to Example 1 were 191 Ah/kg, and the charge-discharge cyclability was 92%.

Example 2

A positive electrode active material for a lithium ion secondary battery according to Example 2 was prepared by the following procedure. First, a positive electrode active material was prepared by the same procedure as in Example 1 except that the raw materials lithium carbonate, nickel carbonate, cobalt carbonate, and manganese carbonate were weighed such that the molar concentration ratio of Li:Ni:Co:Mn was 1.03:0.80:0.10:0.10.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 1.00:0.80:0.10:0.10.

The amounts of LiOH and $Li_2CO_3$ were determined by the same procedure as in Example 1. It turned out that the amount of LiOH was 0.13% by weight, the amount of $Li_2CO_3$ was 0.56% by weight, and the weight of LiOH was 23% of the weight of $Li_2CO_3$. The compositional formula calculated from the average composition and the amount of the free lithium compound determined was $Li_{0.980}Ni_{0.08}Co_{0.10}Mn_{0.10}O_2$.

The open pore volume ratio was 16%. The average particle diameter of the primary particles was 0.6 Gm, and the BET specific surface area was 0.5 $m^2/g$.

Next, a lithium ion secondary battery according to Example 2 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 2 were 198 Ah/kg, and the charge-discharge cyclability was 89%.

Example 3

A positive electrode active material was prepared by the same procedure as in Example 2 except that the temperature during main burning was 760° C.

The average composition of the positive electrode active material was determined. The compositional ratio of Li:Ni:Co:Mn was 1.00:0.80:0.10:0.10.

The amounts of LiOH and $Li_2CO_3$ were determined by the same procedure as in Example 1. It turned out that the amount of LiOH was 0.16% by weight, the amount of $Li_2CO_3$ was 0.59% by weight, and the weight of LiOH was 27% of the weight of $Li_2CO_3$. The compositional formula calculated from the average composition and the amount of the free lithium compound determined was $Li_{0.978}Ni_{0.80}Co_{0.10}Mn_{0.10}O_2$.

The open pore volume ratio was 23%. The average particle diameter of the primary particles was 0.5 μm, and the BET specific surface area was 1.5 $m^2/g$.

Next, a lithium ion secondary battery according to Example 3 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 3 were 202 Ah/kg, and the charge-discharge cyclability was 86%.

Example 4

A positive electrode active material for a lithium ion secondary battery according to Example 4 was prepared by the following procedure. First, a positive electrode active material was prepared by the same procedure as in Example 1 except that the raw materials lithium carbonate, nickel carbonate, and cobalt carbonate were weighed such that the molar concentration ratio of Li:Ni:Co was 1.03:0.85:0.15.

The crystal structure of the resulting positive electrode active material was analyzed. The peak attributed to R3-m was confirmed in the layer structure.

The average composition of the positive electrode active material was determined. The compositional ratio of Li:Ni:Co was 1.00:0.85:0.15.

The amounts of LiOH and $Li_2CO_3$ were determined by the same procedure as in Example 1. It turned out that the amount of LiOH was 0.20% by weight, the amount of $Li_2CO_3$ was 0.60% by weight, and the weight of LiOH was 33% of the weight of $Li_2CO_3$. The compositional formula calculated from the average composition and the amount of the free lithium compound determined was $Li_{0.976}Ni_{0.85}Co_{0.15}O_2$.

The open pore volume ratio was 14%. The average particle diameter of the primary particles was 0.6 μm, and the BET specific surface area was 0.5 $m^2/g$.

Next, a lithium ion secondary battery according to Example 4 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 4 were 205 Ah/kg, and the charge-discharge cyclability was 85%.

Example 5

A positive electrode active material for a lithium ion secondary battery according to Example 5 was prepared by the following procedure. First, a positive electrode active material was prepared by the same procedure as in Example 1 except that the raw materials lithium carbonate, nickel carbonate, and cobalt carbonate were weighed such that the molar concentration ratio of Li:Ni:Co was 1.13:0.80:0.10.

The crystal structure of the resulting positive electrode active material was analyzed. The peak attributed to R3-m was confirmed in the layer structure.

The average composition of the positive electrode active material was determined. The compositional ratio of Li:Ni:Co was 1.10:0.80:0.10.

The amounts of LiOH and $Li_2CO_3$ were determined by the same procedure as in Example 1. It turned out that the amount of LiOH was 0.20% by weight, the amount of $Li_2CO_3$ was 0.80% by weight, and the weight of LiOH was 25% of the weight of $Li_2CO_3$. The compositional formula calculated from the average composition and the amount of the free lithium compound determined was $Li_{1.071}Ni_{0.80}Co_{0.10}O_2$.

The open pore volume ratio was 8%. The average particle diameter of the primary particles was 1.0 μm, and the BET specific surface area was 0.2 $m^2/g$.

Next, a lithium ion secondary battery according to Example 5 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 5 were 186 Ah/kg, and the charge-discharge cyclability was 80%.

Example 6

A positive electrode active material for a lithium ion secondary battery according to Example 6 was prepared by the following procedure. First, a positive electrode active material was prepared by the same procedure as in Example 1 except that the raw materials lithium carbonate, nickel carbonate, cobalt carbonate, and aluminum hydroxide were weighed such that the molar concentration ratio of Li:Ni:Co:Al was 1.03:0.70:0.20:0.10.

The crystal structure of the resulting positive electrode active material was analyzed. The peak attributed to R3-m was confirmed in the layer structure.

The average composition of the positive electrode active material was determined. The compositional ratio of Li:Ni:Co:Al was 1.00:0.70:0.20:0.10.

The amounts of LiOH and $Li_2CO_3$ were determined by the same procedure as in Example 1. It turned out that the amount of LiOH was 0.04% by weight, the amount of $Li_2CO_3$ was 0.36% by weight, and the weight of LiOH was 11% of the weight of $Li_2CO_3$. The compositional formula calculated from the average composition and the amount of the free lithium compound determined was $Li_{0.989}Ni_{0.70}Co_{0.20}Al_{0.10}O_2$.

The open pore volume ratio was 12%. The average particle diameter of the primary particles was 0.6 m, and the BET specific surface area was 0.5 $m^2/g$.

Next, a lithium ion secondary battery according to Example 6 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 6 were 187 Ah/kg, and the charge-discharge cyclability was 92%.

Example 7

A positive electrode active material for a lithium ion secondary battery according to Example 7 was prepared by the following procedure. First, a positive electrode active material was prepared by the same procedure as in Example 1 except that the raw materials lithium carbonate, nickel carbonate, cobalt carbonate, and manganese carbonate were weighed such that the molar concentration ratio of Li:Ni:Co:Mn was 0.98:0.75:0.20:0.10.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 0.95:0.75:0.20:0.10.

The amounts of LiOH and $Li_2CO_3$ were determined by the same procedure as in Example 1. It turned out that the amount of LiOH was 0.28% by weight, the amount of $Li_2CO_3$ was 0.53% by weight, and the weight of LiOH was 53% of the weight of $Li_2CO_3$. The compositional formula calculated from the average composition and the amount of the free lithium compound determined was $Li_{0.925}Ni_{0.75}Co_{0.20}Mn_{0.10}O_2$.

The open pore volume ratio was 11%. The average particle diameter of the primary particles was 0.4 nm, and the BET specific surface area was 0.7 $m^2/g$.

Next, a lithium ion secondary battery according to Example 7 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 7 were 180 Ah/kg, and the charge-discharge cyclability was 84%.

Example 8

A positive electrode active material for a lithium ion secondary battery according to Example 8 was prepared by the following procedure. First, a positive electrode active material was prepared by the same procedure as in Example 1 except that the raw materials lithium carbonate, nickel carbonate, cobalt carbonate, and magnesium hydroxide were weighed such that the molar concentration ratio of Li:Ni:Co:Mg was 1.03:0.80:0.19:0.01.

The crystal structure of the resulting positive electrode active material was analyzed. The peak attributed to R3-m was confirmed in the layer structure.

The average composition of the positive electrode active material was determined. The compositional ratio of Li:Ni:Co:Mg was 1.00:0.80:0.19:0.01.

The amounts of LiOH and $Li_2CO_3$ were determined by the same procedure as in Example 1. It turned out that the amount of LiOH was 0.15% by weight, the amount of $Li_2CO_3$ was 0.53% by weight, and the weight of LiOH was 28% of the weight of $Li_2CO_3$. The compositional formula calculated from the average composition and the amount of the free lithium compound determined was $Li_{0.980}Ni_{0.80}Co_{0.19}Mg_{0.01}O_2$.

The open pore volume ratio was 14%. The average particle diameter of the primary particles was 0.3 μm, and the BET specific surface area was 0.8 $m^2/g$.

Next, a lithium ion secondary battery according to Example 8 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 8 were 195 Ah/kg, and the charge-discharge cyclability was 90%.

Example 9

A positive electrode active material for a lithium ion secondary battery according to Example 9 was prepared by the following procedure. First, a positive electrode active material was prepared by the same procedure as in Example 1 except that the raw materials lithium carbonate, nickel carbonate, cobalt carbonate, and titanium oxide were weighed such that the molar concentration ratio of Li:Ni:Co:Ti was 1.03:0.80:0.19:0.01.

The crystal structure of the resulting positive electrode active material was analyzed. The peak attributed to R3-m was confirmed in the layer structure.

The average composition of the positive electrode active material was determined. The compositional ratio of Li:Ni:Co:Ti was 1.00:0.80:0.19:0.01.

The amounts of LiOH and $Li_2CO_3$ were determined by the same procedure as in Example 1. It turned out that the amount of LiOH was 0.12% by weight, the amount of $Li_2CO_3$ was 0.56% by weight, and the weight of LiOH was 21% of the weight of $Li_2CO_3$. The compositional formula calculated from the average composition and the amount of the free lithium compound determined was $Li_{0.980}Ni_{0.80}Co_{0.19}Ti_{0.01}O_2$.

The open pore volume ratio was 8%. The average particle diameter of the primary particles was 0.5 μm, and the BET specific surface area was 0.4 $m^2/g$.

Next, a lithium ion secondary battery according to Example 9 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 9 were 202 Ah/kg, and the charge-discharge cyclability was 88%.

Example 10

A positive electrode active material for a lithium ion secondary battery according to Example 10 was prepared by the following procedure. First, a positive electrode active material was prepared by the same procedure as in Example 1 except that the raw materials lithium carbonate, nickel carbonate, cobalt carbonate, and zirconium oxide were weighed such that the molar concentration ratio of Li:Ni:Co:Zr was 1.03:0.80:0.19:0.01.

The crystal structure of the resulting positive electrode active material was analyzed. The peak attributed to R3-m was confirmed in the layer structure.

The average composition of the positive electrode active material was determined. The compositional ratio of Li:Ni:Co:Zr was 1.00:0.80:0.19:0.01.

The amounts of LiOH and $Li_2CO_3$ were determined by the same procedure as in Example 1. It turned out that the amount of LiOH was 0.17% by weight, the amount of $Li_2CO_3$ was 0.55% by weight, and the weight of LiOH was 31% of the weight of $Li_2CO_3$. The compositional formula calculated from the average composition and the amount of the free lithium compound determined was $Li_{0.979}Ni_{0.80}Co_{0.19}Zr_{0.10}O_2$.

The open pore volume ratio was 11%. The average particle diameter of the primary particles was 0.5 μm, and the BET specific surface area was 0.4 m$^2$/g.

Next, a lithium ion secondary battery according to Example 10 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 10 were 199 Ah/kg, and the charge-discharge cyclability was 90%.

Example 11

A positive electrode active material for a lithium ion secondary battery according to Example 11 was prepared by the following procedure. First, a positive electrode active material was prepared by the same procedure as in Example 1 except that the raw materials lithium carbonate, nickel carbonate, cobalt carbonate, and molybdenum oxide were weighed such that the molar concentration ratio of Li:Ni:Co:Mo was 1.03:0.80:0.19:0.01.

The crystal structure of the resulting positive electrode active material was analyzed. The peak attributed to R3-m was confirmed in the layer structure.

The average composition of the positive electrode active material was determined. The compositional ratio of Li:Ni:Co:Mo was 1.00:0.80:0.19:0.01.

The amounts of LiOH and $Li_2CO_3$ were determined by the same procedure as in Example 1. It turned out that the amount of LiOH was 0.23% by weight, the amount of $Li_2CO_3$ was 0.72% by weight, and the weight of LiOH was 32% of the weight of $Li_2CO_3$. The compositional formula calculated from the average composition and the amount of the free lithium compound determined was $Li_{0.972}Ni_{0.80}Co_{0.19}Mo_{0.10}O_2$.

The open pore volume ratio was 14%. The average particle diameter of the primary particles was 0.4 μm, and the BET specific surface area was 0.7 m$^2$/g.

Next, a lithium ion secondary battery according to Example 11 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 11 were 193 Ah/kg, and the charge-discharge cyclability was 86%.

Example 12

A positive electrode active material for a lithium ion secondary battery according to Example 12 was prepared by the following procedure. First, a positive electrode active material was prepared by the same procedure as in Example 1 except that the raw materials lithium carbonate, nickel carbonate, cobalt carbonate, and niobium oxide were weighed such that the molar concentration ratio of Li:Ni:Co:Nb was 1.03:0.80:0.19:0.01.

The crystal structure of the resulting positive electrode active material was analyzed. The peak attributed to R3-m was confirmed in the layer structure.

The average composition of the positive electrode active material was determined. The compositional ratio of Li:Ni:Co:Nb was 1.00:0.80:0.19:0.01.

The amounts of LiOH and $Li_2CO_3$ were determined by the same procedure as in Example 1. It turned out that the amount of LiOH was 0.15% by weight, the amount of $Li_2CO_3$ was 0.60% by weight, and the weight of LiOH was 25% of the weight of $Li_2CO_3$. The compositional formula calculated from the average composition and the amount of the free lithium compound determined was $Li_{0.978}Ni_{0.80}Co_{0.19}Nb_{0.01}O_2$.

The open pore volume ratio was 14%. The average particle diameter of the primary particles was 0.4 μm, and the BET specific surface area was 0.7 m$^2$/g.

Next, a lithium ion secondary battery according to Example 12 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 12 were 188 Ah/kg, and the charge-discharge cyclability was 87%.

Example 13

A positive electrode active material for a lithium ion secondary battery according to Example 13 was prepared by the following procedure. First, raw materials lithium carbonate, nickel carbonate, cobalt carbonate, and manganese carbonate were weighed such that the molar concentration ratio of Li:Ni:Co:Mn was 1.00:0.80:0.10:0.10. Core particles were prepared by the same procedure as in Example 1. The average particle diameter of the core particles was 0.6 μm. Lithium carbonate, nickel carbonate, and manganese carbonate were weighed such that the molar concentration ratio of Li:Ni:Mn was 1.22:0.2:0.6. These materials were ground by a wet process, and were mixed to prepare a raw material powder. The raw material powder was dried, and then was placed in a high-purity alumina container to undergo a heat treatment at 700° C. in the air for 12 hours. The pre-burned product was cooled in the air, and was disintegrated.

The average particle diameter of the primary particles of the pre-burned product was calculated in the same manner as in the core particles. The average particle diameter was 0.05 μm. Next, the core particles of the positive electrode active material and the particles of the pre-burned product were weighed such that the weight ratio was 98:2. These particles were wet mixed, and the resulting solution was then spray dried to adhere the particles of the pre-burned product onto the surfaces of the core particles. The resulting particles were then placed in a high-purity alumina container to undergo a heat treatment under an oxygen stream at 800° C. for 1 hour. A positive electrode active material for a lithium ion secondary battery according to Example 13 was prepared.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 1.01:0.78:0.10:0.11.

Next, element analysis was performed on the surface and near the center of the positive electrode active material. A sample of the positive electrode active material was formed into a thin piece with a polisher (Model 600, manufactured by Gatan Inc.) by argon ion etching, and was then used in element analysis. The element analysis such as the concentration distribution of atoms on the surface was performed with an electric field-emission transmission electron microscope (HF-2000 manufactured by Hitachi, Ltd. (hereinafter abbreviated to TEM)) including an electron energy loss spectrometer (hereinafter abbreviated to EELS) (Enfina manufactured by Gatan Inc.) to measure and confirm the sample at an accelerating voltage of 200 kV. Besides, the element distribution can be confirmed by TEM-EDS in combination with a TEM and an X-ray analyzer (EDS), time-of-flight secondary ion mass spectrometry (TOF-SIMS), or auger electron spectroscopy (AES).

The concentration ratio (atomic ratio) of Ni/(Ni+Co+Mn) was about 0.65 in the region ranging from the outer surface of the positive electrode active material to a depth of 20 nm, was about 0.70 in the region ranging from a depth of 20 nm to a depth of 60 nm, and was about 0.80 in the region ranging from the outer surface to a depth of more than 90 nm. The concentration ratio of Ni/(Ni+Co+Mn) is constant in the region ranging from the outer surface to a depth of more than 90 nm; thus, it is inferred that the concentration ratio of Ni/(Ni+Co+Mn) near the center is about 0.80. It was thus confirmed that the concentration ratio of Ni/(Ni+Co+Mn) on the surface of the positive electrode active material was lower than that near the center thereof.

The amounts of LiOH and $Li_2CO_3$ were determined by the same procedure as in Example 1. It turned out that the amount of LiOH was 0.02% by weight, the amount of $Li_2CO_3$ was 0.08% by weight, and the weight of LiOH was 25% of the weight of $Li_2CO_3$. The compositional formula calculated from the average composition and the amount of the free lithium compound determined was $Li_{1.007}Ni_{0.78}Co_{0.10}Mn_{0.11}O_2$.

The open pore volume ratio was 8%. The average particle diameter of the primary particles was 0.5 μm, and the BET specific surface area was 0.4 $m^2/g$.

Next, a lithium ion secondary battery according to Example 13 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 13 were 187 Ah/kg, and the charge-discharge cyclability was 94%.

Example 14

A positive electrode active material for a lithium ion secondary battery according to Example 14 was prepared by the following procedure. First, a positive electrode active material was prepared by the same procedure as in Example 1 except that the raw materials lithium carbonate, nickel carbonate, and cobalt carbonate were weighed such that the molar concentration ratio of Li:Ni:Co was 1.22:0.70:0.10.

The crystal structure of the resulting positive electrode active material was analyzed. The peak attributed to R3-m was confirmed in the layer structure.

The average composition of the positive electrode active material was determined. The compositional ratio of Li:Ni:Co was 1.20:0.70:0.10.

The amounts of LiOH and $Li_2CO_3$ were determined by the same procedure as in Example 1. It turned out that the amount of LiOH was 0.22% by weight, the amount of $Li_2CO_3$ was 1.1% by weight, and the weight of LiOH was 20% of the weight of $Li_2CO_3$. The compositional formula calculated from the average composition and the amount of the free lithium compound determined was $Li_{1.162}Ni_{0.70}Co_{0.10}O_2$.

The open pore volume ratio was 10%. The average particle diameter of the primary particles was 0.2 μm, and the BET specific surface area was 1.0 $m^2/g$.

Next, a lithium ion secondary battery according to Example 14 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 14 were 175 Ah/kg, and the charge-discharge cyclability was 85%.

Example 15

A positive electrode active material for a lithium ion secondary battery according to Example 15 was prepared by the following procedure. First, a positive electrode active material was prepared by the same procedure as in Example 1 except that the raw materials lithium carbonate, nickel carbonate, cobalt carbonate, and manganese carbonate were weighed such that the molar concentration ratio of Li:Ni:Co:Mn was 0.92:0.80:0.20:0.10.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 0.90:0.80:0.20:0.10.

The amounts of LiOH and $Li_2CO_3$ were determined by the same procedure as in Example 1. It turned out that the amount of LiOH was 0.10% by weight, the amount of $Li_2CO_3$ was 0.45% by weight, and the weight of LiOH was 22% of the weight of $Li_2CO_3$. The compositional formula calculated from the average composition and the amount of the free lithium compound determined was $Li_{0.884}Ni_{0.80}Co_{0.20}Mn_{0.10}O_2$.

The open pore volume ratio was 17%. The average particle diameter of the primary particles was 0.4 μm, and the BET specific surface area was 0.7 $m^2/g$.

Next, a lithium ion secondary battery according to Example 15 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 15 were 181 Ah/kg, and the charge-discharge cyclability was 83%.

Example 16

A positive electrode active material for a lithium ion secondary battery according to Example 16 was prepared by the following procedure. First, a positive electrode active material was prepared by the same procedure as in Example 2 except that the temperature during main burning was 800° C.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 1.00:0.80:0.10:0.10.

The amounts of LiOH and $Li_2CO_3$ were determined by the same procedure as in Example 1. It turned out that the amount of LiOH was 0.31% by weight, the amount of $Li_2CO_3$ was 1.50% by weight, and the weight of LiOH was 21% of the weight of $Li_2CO_3$. The compositional formula calculated from the average composition and the amount of the free lithium compound determined was $Li_{0.948}Ni_{0.80}Co_{0.10}Mn_{0.10}O_2$.

The open pore volume ratio was 20%. The average particle diameter of the primary particles was 0.1 μm, and the BET specific surface area was 1.8 m²/g.

Next, a lithium ion secondary battery according to Example 16 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 16 were 182 Ah/kg, and the charge-discharge cyclability was 80%.

Example 17

A positive electrode active material for a lithium ion secondary battery according to Example 17 was prepared by the following procedure. First, a positive electrode active material was prepared by the same procedure as in Example 2 except that the temperature during main burning was 900° C.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 1.00:0.80:0.10:0.10.

The amounts of LiOH and $Li_2CO_3$ were determined by the same procedure as in Example 1. It turned out that the amount of LiOH was 0.08% by weight, the amount of $Li_2CO_3$ was 0.15% by weight, and the weight of LiOH was 53% of the weight of $Li_2CO_3$. The compositional formula calculated from the average composition and the amount of the free lithium compound determined was $Li_{0.993}Ni_{0.80}Co_{0.10}Mn_{0.10}O_2$.

The open pore volume ratio was 7%. The average particle diameter of the primary particles was 2.4 μm, and the BET specific surface area was 0.1 m²/g.

Next, a lithium ion secondary battery according to Example 17 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 17 were 184 Ah/kg, and the charge-discharge cyclability was 80%.

Example 18

A positive electrode active material for a lithium ion secondary battery according to Example 18 was prepared by the following procedure. First, a positive electrode active material was prepared by the same procedure as in Example 1 except that the raw materials lithium hydroxide, nickel carbonate, cobalt carbonate, and manganese carbonate were weighed such that the molar concentration ratio of Li:Ni:Co:Mn was 1.05:0.80:0.10:0.10, the temperature during main burning was 750° C., and the burned product was cooled with the air in a $CO_2$ atmosphere.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 1.00:0.80:0.10:0.10.

The amounts of LiOH and $Li_2CO_3$ were determined by the same procedure as in Example 1. It turned out that the amount of LiOH was 0.24% by weight, the amount of $Li_2CO_3$ was 0.65% by weight, and the weight of LiOH was 37% of the weight of $Li_2CO_3$. The compositional formula calculated from the average composition and the amount of the free lithium compound determined was $Li_{0.973}Ni_{0.80}Co_{0.10}Mn_{0.10}O_2$.

The open pore volume ratio was 11%. The average particle diameter of the primary particles was 1.0 μm, and the BET specific surface area was 0.2 m²/g.

Next, a lithium ion secondary battery according to Example 18 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Example 18 were 196 Ah/kg, and the charge-discharge cyclability was 85%.

Comparative Example 1

A positive electrode active material for a lithium ion secondary battery according to Comparative Example 1 was prepared by the following procedure. The positive electrode active material for a lithium ion secondary battery according to Comparative Example 1 comprises Ni in a lower ratio than those in the Examples.

First, a positive electrode active material was prepared by the same procedure as in Example 1 except that the raw materials lithium carbonate, nickel carbonate, cobalt carbonate, and manganese carbonate were weighed such that the molar concentration ratio of Li:Ni:Co:Mn was 1.02:0.60:0.20:0.20.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 1.00:0.60:0.20:0.20.

The amounts of LiOH and $Li_2CO_3$ were determined by the same procedure as in Example 1. It turned out that the amount of LiOH was 0.05% by weight, the amount of $Li_2CO_3$ was 0.12% by weight, and the weight of LiOH was 42% of the weight of $Li_2CO_3$. The compositional formula calculated from the average composition and the amount of the free lithium compound determined was $Li_{0.995}Ni_{0.60}Co_{0.20}Mn_{0.20}O_2$.

The open pore volume ratio was 5%. The average particle diameter of the primary particles was 0.6 μm, and the BET specific surface area was 0.5 m²/g.

Next, a lithium ion secondary battery according to Comparative Example 1 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Comparative Example 1 were 170 Ah/kg, and the charge-discharge cyclability was 93%.

Comparative Example 2

A positive electrode active material for a lithium ion secondary battery according to Comparative Example 2 was prepared by the following procedure. The positive electrode active material for a lithium ion secondary battery according to Comparative Example 2 comprises Ni in a higher ratio than those in the Examples. Lithium hydroxide was used as a Li source.

First, a positive electrode active material was prepared by the same procedure as in Example 1 except that raw materials lithium hydroxide and nickel carbonate were weighed such that the molar concentration ratio of Li:Ni was 1.05:1.00 and the temperature during main burning was 730° C.

The crystal structure of the resulting positive electrode active material was analyzed. The peak attributed to R3-m was confirmed in the layer structure.

The average composition of the positive electrode active material was determined. The compositional ratio of Li:Ni was 1.00:1.00.

The amounts of LiOH and $Li_2CO_3$ were determined by the same procedure as in Example 1. It turned out that the amount of LiOH was 1.80% by weight, the amount of $Li_2CO_3$ was 0.25% by weight, and the weight of LiOH was 720% of the weight of $Li_2CO_3$. The compositional formula calculated from the average composition and the amount of the free lithium compound determined was $Li_{0.920}Ni_{1.00}O_2$.

The open pore volume ratio was 10%. The average particle diameter of the primary particles was 2.1 μm, and the BET specific surface area was 0.1 m²/g.

Next, a lithium ion secondary battery according to Comparative Example 2 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Comparative Example 2 were 135 Ah/kg, and the charge-discharge cyclability was 61%.

Comparative Example 3

A positive electrode active material for a lithium ion secondary battery according to Comparative Example 3 was prepared by the following procedure. The positive electrode active material for a lithium ion secondary battery according to Comparative Example 3 comprises particles comprising the free lithium compound containing LiOH in a higher weight ratio than those in the Examples.

First, a positive electrode active material was prepared by the same procedure as in Example 1 except that raw materials lithium hydroxide, nickel carbonate, cobalt carbonate, and manganese carbonate were weighed such that the molar concentration ratio of Li:Ni:Co:Mn was 1.05:0.75:0.15:0.10 and the temperature during main burning was 750° C.

The crystal structure of the resulting positive electrode active material was analyzed. The peak attributed to R3-m was confirmed in the layer structure.

The average composition of the positive electrode active material was determined. The compositional ratio of Li:Ni:Co:Mn was 1.00:0.75:0.15:0.10.

The amounts of LiOH and $Li_2CO_3$ were determined by the same procedure as in Example 1. It turned out that the amount of LiOH was 0.72% by weight, the amount of $Li_2CO_3$ was 0.19% by weight, and the weight of LiOH was 379% of the weight of $Li_2CO_3$. The compositional formula calculated from the average composition and the amount of the free lithium compound determined was $Li_{0.966}Ni_{0.75}Co_{0.15}Mn_{0.10}O_2$.

The open pore volume ratio was 3%. The average particle diameter of the primary particles was 1.6 μm, and the BET specific surface area was 0.1 m²/g.

Next, a lithium ion secondary battery according to Comparative Example 3 including a positive electrode comprising the positive electrode active material was prepared by the same procedure as in Example 1 to evaluate the discharge capacity properties and the charge-discharge cyclability. As a result, the discharge capacity properties of the lithium ion secondary battery according to Comparative Example 3 were 192 Ah/kg, and the charge-discharge cyclability was 75%.

The discharge capacity properties (Ah/kg) and the charge-discharge cyclability (%) of the lithium ion secondary batteries according to Examples 1 to 18 and Comparative Examples 1 to 3 as well as the composition of the positive electrode active material and the amount of the free lithium compound, the open pore volume ratio, the average particle diameter of the primary particles, and the BET specific surface area are shown in Table 1.

In Examples, the compositional formulae were calculated by the following procedure. Since the positive electrode active material according to the present invention has a layer structure, the positive electrode active material is represented by $LiM'O_2$ (where M' is a metal element). Accordingly, the respective molar concentration ratios are determined from the amounts (mass %) of Li, Ni, Co, and M determined from the measurement, and the amounts of these elements are proportionally distributed such that the sum of the molar concentration ratios is 2. Thereby, the compositional ratio of the elements other than oxygen can be calculated, and the coefficients x, y, and z in the compositional formula $Li_{1+x}Ni_yCo_zM_{1-x-y-z}O_2$ can be calculated for evaluation.

Throughout the specification, the values of the coefficients in Examples indicate values obtained by proportionally distributing Li, Ni, Co, and M, before determination of the amount of lithium related to the free lithium compound, such that the sum of the molar concentration ratios of Li, Ni, Co, and M is 2, and subtracting the amount of lithium related to the free lithium compound from the proportionally distributed amount of Li. In Examples, then, the obtained amounts of the four elements are proportionally distributed again such that the sum of the values of the coefficients is 2; thereby, the exact values of the coefficients x, y, and z can be determined.

TABLE 1

| | Composition | Open pore volume ratio (%) | Amount of free lithium compound (% by weight) | LiOH/ $Li_2CO_3$ (%) | Average particle diameter (μm) | BET specific surface area (m²/g) | Discharge capacity properties (Ah/kg) | Charge-discharge cyclability (%) |
|---|---|---|---|---|---|---|---|---|
| Example 1 | $Li_{0.984}Ni_{0.75}Co_{0.15}Mn_{0.10}O_2$ | 14 | 0.57 | 16 | 0.6 | 0.5 | 191 | 92 |
| Example 2 | $Li_{0.980}Ni_{0.80}Co_{0.10}Mn_{0.10}O_2$ | 16 | 0.69 | 23 | 0.6 | 0.5 | 198 | 89 |
| Example 3 | $Li_{0.978}Ni_{0.80}Co_{0.10}Mn_{0.10}O_2$ | 23 | 0.75 | 27 | 0.5 | 1.5 | 202 | 86 |
| Example 4 | $Li_{0.976}Ni_{0.85}Co_{0.15}O_2$ | 14 | 0.80 | 33 | 0.6 | 0.5 | 205 | 85 |
| Example 5 | $Li_{1.071}Ni_{0.80}Co_{0.10}O_2$ | 8 | 1.00 | 25 | 1.0 | 0.2 | 186 | 80 |

TABLE 1-continued

|  | Composition | Open pore volume ratio (%) | Amount of free lithium compound (% by weight) | LiOH/ $Li_2CO_3$ (%) | Average particle diameter (μm) | BET specific surface area (m²/g) | Discharge capacity properties (Ah/kg) | Charge-discharge cyclability (%) |
|---|---|---|---|---|---|---|---|---|
| Example 6 | $Li_{0.989}Ni_{0.70}Co_{0.20}Al_{0.10}O_2$ | 12 | 0.40 | 11 | 0.6 | 0.5 | 187 | 92 |
| Example 7 | $Li_{0.925}Ni_{0.75}Co_{0.20}Mn_{0.10}O_2$ | 11 | 0.81 | 53 | 0.4 | 0.7 | 180 | 84 |
| Example 8 | $Li_{0.980}Ni_{0.80}Co_{0.19}Mg_{0.01}O_2$ | 14 | 0.68 | 28 | 0.3 | 0.8 | 195 | 90 |
| Example 9 | $Li_{0.980}Ni_{0.80}Co_{0.19}Ti_{0.01}O_2$ | 8 | 0.68 | 21 | 0.5 | 0.4 | 202 | 88 |
| Example 10 | $Li_{0.979}Ni_{0.80}Co_{0.19}Zr_{0.01}O_2$ | 11 | 0.72 | 31 | 0.5 | 0.4 | 199 | 90 |
| Example 11 | $Li_{0.972}Ni_{0.80}Co_{0.19}Mo_{0.01}O_2$ | 14 | 0.95 | 32 | 0.4 | 0.7 | 193 | 86 |
| Example 12 | $Li_{0.978}Ni_{0.80}Co_{0.19}Nb_{0.01}O_2$ | 14 | 0.75 | 25 | 0.4 | 0.7 | 188 | 87 |
| Example 13 | $Li_{1.007}Ni_{0.78}Co_{0.10}Mn_{0.11}O_2$ | 8 | 0.10 | 25 | 0.5 | 0.4 | 187 | 94 |
| Example 14 | $Li_{1.162}Ni_{0.70}Co_{0.10}O_2$ | 10 | 1.32 | 20 | 0.2 | 1.0 | 175 | 85 |
| Example 15 | $Li_{0.884}Ni_{0.80}Co_{0.20}Mn_{0.10}O_2$ | 17 | 0.55 | 22 | 0.4 | 0.7 | 181 | 83 |
| Example 16 | $Li_{0.948}Ni_{0.80}Co_{0.10}Mn_{0.10}O_2$ | 20 | 1.81 | 21 | 0.1 | 1.8 | 182 | 80 |
| Example 17 | $Li_{0.993}Ni_{0.80}Co_{0.10}Mn_{0.10}O_2$ | 7 | 0.23 | 53 | 2.4 | 0.1 | 184 | 80 |
| Example 18 | $Li_{0.973}Ni_{0.80}Co_{0.10}Mn_{0.10}O_2$ | 11 | 0.89 | 37 | 1.0 | 0.2 | 196 | 85 |
| Comparative Example 1 | $Li_{0.995}Ni_{0.60}Co_{0.20}Mn_{0.20}O_2$ | 5 | 0.17 | 42 | 0.6 | 0.5 | 170 | 93 |
| Comparative Example 2 | $Li_{0.920}Ni_{1.00}O_2$ | 1 | 2.05 | 720 | 2.1 | 0.1 | 135 | 61 |
| Comparative Example 3 | $Li_{0.966}Ni_{0.75}Co_{0.15}Mn_{0.10}O_2$ | 3 | 0.91 | 379 | 1.6 | 0.1 | 192 | 75 |

Figure 3:
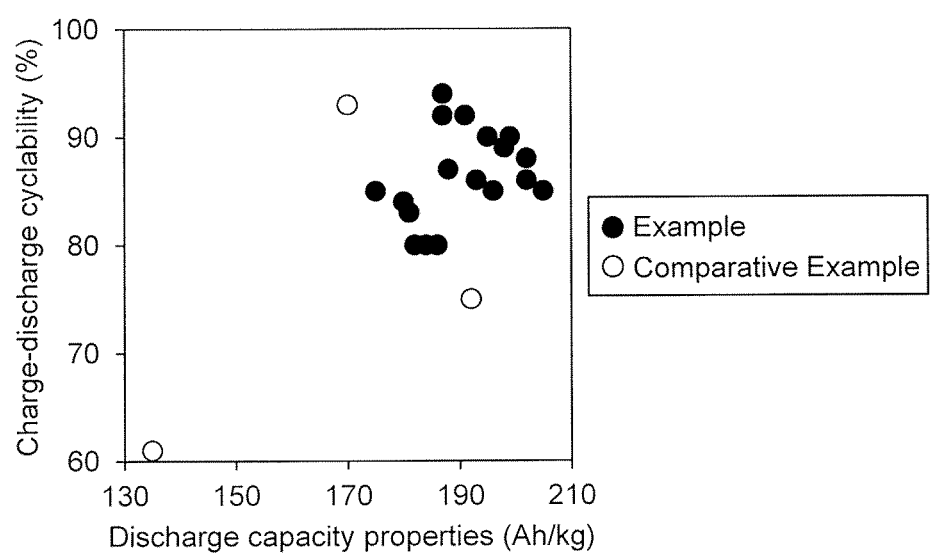
FIG. 3 is a diagram illustrating the relationship between the capacity and the charge-discharge cyclability of the lithium ion secondary batteries according to the Examples and the Comparative Examples.

FIG. 3 is a diagram illustrating the relationship between the discharge capacity properties and the charge-discharge cyclability of the lithium ion secondary batteries according to the Examples and the Comparative Examples. As illustrated in FIG. 3, the lithium ion secondary batteries according to Examples 1 to 18 have high discharge capacity properties and high charge-discharge cyclability at high levels. In contrast, the lithium ion secondary batteries according to Comparative Examples 1 to 3 have at least one of the discharge capacity properties and the charge-discharge cyclability lower than those in the Examples, and do not attain preferable compatibility between the discharge capacity properties and the charge-discharge cyclability.

In particular, the lithium ion secondary battery in Comparative Example 1 having Ni at a low ratio (y) and that in Comparative Example 2 having Ni at a high ratio (y) had low discharge capacity properties of 135 Ah/kg to 170 Ah/kg as shown in Table 1. In contrast, the lithium ion secondary battery in Example 1 having Ni at an appropriate ratio (y) had improved discharge capacity properties. The lithium ion secondary batteries in Examples 2 to 18 also tended to have improved discharge capacity properties.

The lithium ion secondary batteries in Comparative Examples 2 and 3 having LiOH at a high ratio in the free lithium compound had a low charge-discharge cyclability of 61% to 75%. It is believed that the charge-discharge cyclability of the lithium ion secondary batteries in Comparatives Examples 2 and 3 was reduced because of decomposition of the electrolyte solution caused by contact between LiOH and the electrolyte solution. In contrast, the lithium ion secondary batteries in Examples 1 to 18 tended to have improved charge-discharge cyclability. Accordingly, it was confirmed that control of the weight proportion of LiOH in the free lithium compound to be 60% or less of the weight of $Li_2CO_3$ contributes to prevention of progression of decomposition of the electrolyte solution caused by contact between LiOH and the electrolyte solution and an improvement in the discharge capacity properties and the charge-discharge cyclability without reducing the discharge capacity of the positive electrode active material.

DESCRIPTION OF SYMBOLS

1 Positive electrode
2 Negative electrode
3 Separator
4 Battery can
5 Negative electrode lead piece
6 Hermetically sealing lid
7 Positive electrode lead piece
8 Sealing material
9 Insulating plate
10 Lithium ion secondary battery

What is claimed is:
1. A positive electrode active material for a lithium ion secondary battery, comprising:
a secondary particle into which a primary particle aggregates, wherein the primary particle is represented by Compositional Formula (1):

$$Li_{1+x}Ni_yCo_zM_{1-x-y-z}O_2 \quad (1)$$

where x is a number satisfying a relation represented by an expression −0.12≤x≤0.2; y is a number satisfying a relation represented by an expression 0.7≤y≤0.9; z is a number satisfying a relation represented by an expression 0.05≤z≤0.3; and M is at least one element selected from the group consisting of Mg, Al, Ti, Mn, Zr, Mo, and Nb;
wherein the primary particle and the secondary particle comprise a free lithium compound in a weight proportion of 0.1% or more and 2.0% or less, and the weight of lithium hydroxide in the free lithium compound is 60% or less of the weight of lithium carbonate in the free lithium compound;
wherein the secondary particle has an open pore, and an open pore volume ratio is 7% or more and 20% or less at a micropore diameter ranging from 0.1 μm or more to 0.5 μm or less, the open pore volume being determined by mercury porosimetry.
2. The positive electrode active material for a lithium ion secondary battery according to claim 1, wherein the weight proportion of the free lithium compound comprised in the primary particle and the secondary particle is 0.1% or more and 1.0% or less.
3. The positive electrode active material for a lithium ion secondary battery according to claim 1, wherein a Ni concentration on the surface of the primary particle or the secondary particle is lower than a Ni concentration near the center of the primary particle or the secondary particle.

4. The positive electrode active material for a lithium ion secondary battery according to claim 1, wherein the average particle diameter of the primary particle is 0.1 μm or more and 2 μm or less.

5. The positive electrode active material for a lithium ion secondary battery according to claim 1, wherein the weight proportion of the free lithium compound comprised in the primary particle or the secondary particle is 0.1% or more and 1.0% or less, and a Ni concentration on the surface of the primary particle or the secondary particle is lower than a Ni concentration near the center of the primary particle or the secondary particle, and the average particle diameter of the primary particle is 0.1 μm or more and 2 μm or less.

6. The positive electrode active material for a lithium ion secondary battery according to claim 1, wherein the content of lithium carbonate in the primary particle and the secondary particle is 0.07% by weight or more and 1.50% by weight or less.

7. The positive electrode active material for a lithium ion secondary battery according to claim 1, wherein a BET specific surface area of the positive electrode active material is 0.2 $m^2/g$ or more and 1.0 $m^2/g$ or less.

8. A positive electrode for a lithium ion secondary battery formed from the positive electrode active material according to claim 1.

9. The positive electrode for a lithium ion secondary battery according to claim 8, wherein the weight proportion of the free lithium compound comprised in the primary particle and the secondary particle is 0.1% or more and 1.0% or less.

10. The positive electrode for a lithium ion secondary battery according to claim 8, wherein a Ni concentration on the surface of the primary particle or the secondary particle is lower than a Ni concentration near the center of the primary particle or the secondary particle.

11. The positive electrode for a lithium ion secondary battery according to claim 8, wherein the average particle diameter of the primary particle is 0.1 μm or more and 2 μm or less.

12. A lithium ion secondary battery, comprising the positive electrode according to claim 8.

* * * * *